3,063,547
CONVEYOR SYSTEMS
Henry Walter Mayer King, Stevenage, England
Filed Feb. 2, 1960, Ser. No. 6,218
Claims priority, application Great Britain Mar. 17, 1959
11 Claims. (Cl. 198—232)

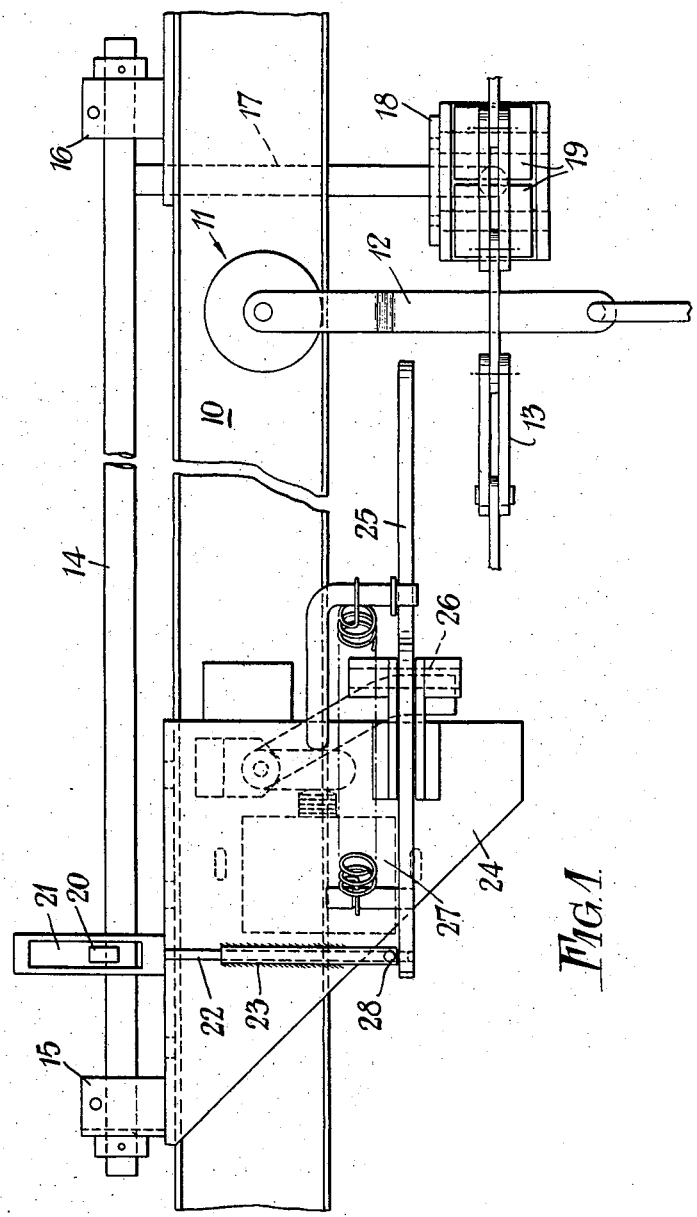

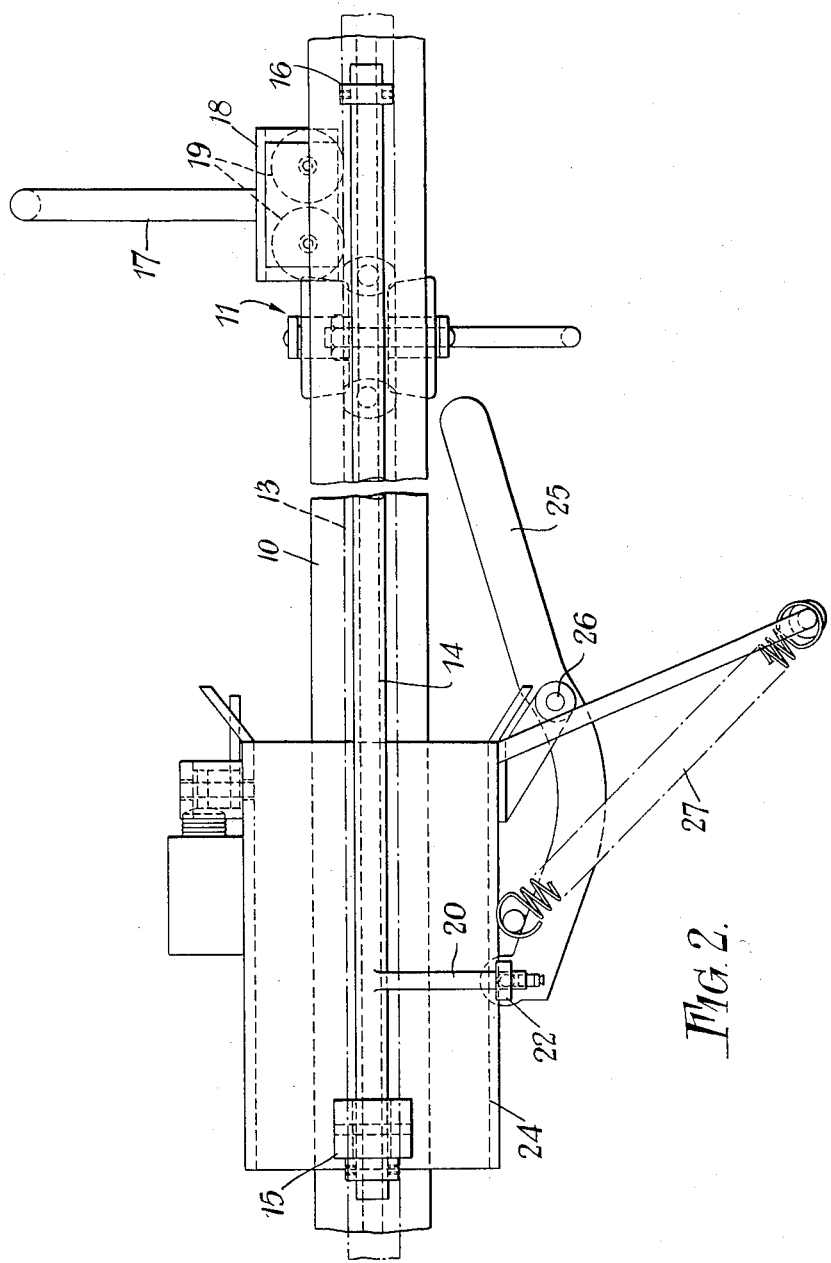

This invention relates to conveyor systems of the kind wherein loads to be transported are attached to load bars or hangers which depend from trolleys running along a fixed overhead track. The trolleys are movable by means of an endless driving chain which is coupled to the load bars or hangers to move in a path intermediate said track and the loads.

It is the chief object of the invention to provide safety stop means which will be effective, on breakage of the driving chain to prevent uncontrolled travel of loads along sections of the conveyor path which are inclined to the horizontal.

According to the invention in a conveyor system of the kind set forth there is provided a safety stop mechanism comprising a feeler element adapted to cooperate with the chain, a stop member, bolt or latch means adapted normally to retain said stop member in an inoperative position and means coupling said element to said bolt or latch means in such a manner that on breakage of or undue slackening of tension in the chain the feeler element will move thereby to cause actuation of the bolt or latch means such as will result in release of the stop member for movement into an operative position wherein it will lie in the path of the load bars or hangers thereby positively to prevent further travel thereof. Preferably the stop member will comprise a pivoted lever which is spring or otherwise loaded so that upon release of the bolt or latch means it will move rapidly into its operative position.

In order that the said invention may be clearly understood and readily carried into effect the same will now be more fully described with reference to the accompanying drawings in which:

FIGURE 1 is a side elevational view of a safety stop mechanism,

FIGURE 2 is a plan view of the mechanism shown in FIGURE 1.

Referring now to the drawings 10 denotes a portion of a fixed overhead track along which trolleys are adapted to run, one of such trolleys being indicated at 11. Each trolley is provided with a depending load bar or hanger 12 from which loads to be conveyed are suspended and movement is imparted thereto by means of an endless driven chain a part of which is indicated at 13. Generally the trolleys are spaced along the chain at substantially equal distances apart. Such conveyors are well known but it will be appreciated that if the chain 13 were to break when travelling along a path inclined to the horizontal the loads which are effectively attached to and maintained in position by the chain in such inclined section of the conveyor would become free to roll under the influence of gravity and thus be capable of causing considerable damage. It is with that particular problem that the invention is concerned.

Disposed above and extending parallel to a part of the track 10, which part although shown in the drawings as being horizontal will in practice be inclined to the horizontal, is a rod 14 which is so supported in brackets 15 and 16 as to be capable of free angular or rotary movement about its longitudinal axis. Fixedly attached to one end of the rod 14 so as to project laterally therefrom is one limb of a bracket 17 which approximates in shape a U turned on its side. The lower limb of the bracket 17, which limb is disposed substantially at the level of the chain 13, carries at its free end a cage or support 18 in which a pair of rollers 19 is freely rotatably supported, such rollers being adapted to cooperate with the chain. By reason of the weight of the bracket 17 and of the rollers 19 and of the fact that the rod 14 is supported for free rotational movement the rollers 19 will bear against the chain but the construction will be such that they will not to any appreciable extent add to the frictional drag on said chain. Fixedly mounted at the end of the rod 14 is an arm 20 which projects laterally therefrom in a direction opposite to that of bracket 17. The outer or free end portion of the arm 20 is adapted to project through a loop or slot 21 provided at the upper part of a rod or bolt like element 22 which is supported for vertical sliding movement in a bearing sleeve or tube 23 in turn fixedly supported on a bracket or the like 24 which in the embodiment illustrated is of inverted U shape in section and is attached to the track 10 to embrace the latter while allowing sufficient clearance for free passage of the trolleys 11. At its lower end the rod or bolt like element 22 is adapted to engage in a slot formed at or adjacent one end of a pivoted stop lever 25. The stop lever 25, which is supported at a point intermediate its ends for pivotal movement about a fixed pivot 26 carried by a lug or projection on the aforesaid bracket or the like 24, is so constructed and arranged that when in its inoperative position as shown in the drawings and wherein it is engaged by the rod or bolt like element 22 it will be maintained clear of the path of travel of the load bars or hangers on the trolleys which serve to support the chain 13. When however the rod or bolt like element 22 is withdrawn as will be hereinafter described the lever 25 is adapted to move angularly about its pivot 26 under the action of a spring 27 into a position wherein that end thereof remote from the aforesaid slot will extend completely across the path of travel of the load bars or hangers thereby to prevent further travel thereof. When said lever 25 is in its operative position the outer or free end thereof is adapted to abut against an abutment surface provided by that portion of the bracket 24 disposed at that side of the path of travel of the load bars or hangers remote from the pivot point of the lever 25. Preferably a ball catch or other resilient locking means such as indicated at 28 will be disposed to cooperate with the rod or bolt like element 22 to hold the same in its uppermost or retracted position out of contact with the lever 25 upon actuation of the mechanism thereby to prevent any possibility of return movement.

The mechanism above described is adapted to operate in the following manner.

Normally the rollers 19 carried by the bracket 17 will bear against the chain 13 and the rod 14 will be maintained in a position such that the rod or bolt like element 22 which is engaged by arm 20 will be in its lowermost position wherein it will engage the slot in the pivoted stop lever 25 which will thus be maintained in its inoperative position out of the path of travel of the load bars or hangers. Upon breakage of the chain the rollers 19 will have nothing on which to bear and the bracket 17 will swing forwardly thereby imparting an angular movement to the rod 14 which will result in a corresponding angular movement of the arm 20 sufficient to cause retraction of the rod or bolt like element 22 from engagement with the pivoted stop lever 25. Upon such retraction of said rod or bolt like element 22 the stop lever 25 will snap under the action of its spring 27 into its operative position wherein it will extend across the path of travel of the load bars or hangers of the trolleys on the track 10 and thus provide a rigid stop which will prevent any further travel of the load bars or hangers and of the loads carried thereby such as might otherwise cause extensive damage.

The arrangement may conveniently be such that movement of the stop lever 25 into its operative position will result in the operation of a cam switch or the like to cut off the drive to the conveyor chain.

If desired a plurality of mechanisms such as that described above may be disposed successively along inclined sections of a conveyor path thereby to provide a succession of automatic safety stops any one of which may be actuated dependent upon the position at which breakage of the chain occurs. In order to ensure that the stops are disposed relatively closely together and thereby to reduce to a minimum the distance through which uncontrolled travel of the loads can take place in the event of chain breakage the several mechanisms may be arranged in overlapping relation i.e. the arrangement may be such that the rollers 19 on the bracket 17 of one mechanism will be so disposed as to contact the chain at a point intermediate the rollers 19 on the bracket 17 of the next adjacent mechanism and the stop lever 25 of such next mechanism.

I claim:

1. In a conveyor system having a chain, load bars movable by said chain and safety mechanism, the latter mechanism comprising: a feeler element operatively positioned to bear against the chain, a pivoted stop lever adjacent the chain, resilient means urging said lever into an operative position wherein it will project into the path of the load bars, a bolt normally operative to engage said lever and to maintain it in an inoperative position clear of said load bars and means coupling said feeler element to the bolt such that upon movement of the feeler element resultant upon breakage of or undue slackening of tension in the chain said bolt will be moved to release the stop lever which will then move under the action of the resilient means into its operative position.

2. In a conveyor system having a chain, load bars movable by said chain and a safety mechanism, the latter mechanism comprising: a pivoted stop lever adjacent the chain, resilient means urging said lever into an operative position wherein it will project into the path of the load bars, a bolt normally operative to engage the lever and to maintain the same in an inoperative position, a rod extending substantially parallel to the chain and supported for angular movement about its longitudinal axis, a feeler element on said rod and in bearing engagement with the chain, said rod being angularly moved on breakage of or undue slackening of tension in the chain, an arm also carried by said rod and operatively coupled to said bolt such that on angular movement of said rod, said arm will move the bolt out of engagement with the lever thereby to allow movement of the latter into its operative position under the action of said resilient means.

3. A safety stop mechanism as claimed in claim 2 in which the bolt is slidable axially into and out of engagement with the pivoted stop lever, the mechanism further comprising resilient locking means for retaining said bolt in its inoperative position subsequent to movement thereof by the arm.

4. A safety stop mechanism as claimed in claim 2 wherein the feeler element comprises a bracket which is fixedly attached to the rod and at least one roller supported by said bracket to contact the chain and be freely rotatable.

5. A safety mechanism for a conveyor system of the type in which a driving chain is adapted to move along a path to drive load bars which are suspended from trolleys which are rollably supported in a track, the safety mechanism comprising means operatively suspended adjacent said chain to engage the same and be held in position thereby, stop means for extending in the path of the load bars to engage the same to prevent movement thereof and means engaging both of the other means and providing a stop for preventing the stop means from extending in the path of the load bars with the first said means engaged against the chain, the last said means being disengaged from the stop means with the chain disengaged from the first said means to permit the stop means to extend in the path of the load bars to prevent movement of the load bars.

6. A safety mechanism for a conveyor system of the type in which a driving chain is adapted to move along a path to drive load bars which are suspended from trolleys which are rollably supported in a track, the safety mechanism comprising a rod supported for pivotable movement relative to the chain from a fixed location with respect thereto, a feeler element on said rod engaging said chain, stop means for extending in the path of the load bars to engage the same to prevent movement thereof and means coupled to said stop means and engaged with said rod to normally maintain the stop means out of the path of the load bars under the action of said feeler element engaged against said chain, the latter said means being disengaged from said stop means to permit the same to extend in the path of the load bars with the feeler element out of engagement with the chain and the rod pivotably moved relative to the chain.

7. A safety mechanism as claimed in claim 6 wherein the feeler element includes a bracket which has a center of gravity which is eccentric with respect to said chain such that said feeler element is urged against said chain.

8. A safety mechanism as claimed in claim 7 wherein said bracket is substantially of U shape.

9. A safety mechanism as claimed in claim 6 comprising means pivotally supporting the stop means for movement about an axis extending perpendicularly to the path of the chain.

10. A safety mechanism as claimed in claim 6 wherein the means coupled to the stop means and engaged with the rod includes a bolt movably supported for engaging said stop means to hold the same in position, said rod causing displacement of said bolt as said rod is pivotably moved whereby said stop means is free to move into position to block movement of said load hangers.

11. A safety mechanism as claimed in claim 10 comprising an arm on said rod for engaging said bolt to move the same in accordance with pivotal movement of said rod.

References Cited in the file of this patent

UNITED STATES PATENTS

| | | |
|---|---|---|
| 709,202 | Clarke | Sept. 16, 1902 |
| 1,806,913 | Paquette | May 26, 1931 |